United States Patent
Bucher

(10) Patent No.: US 6,189,028 B1
(45) Date of Patent: Feb. 13, 2001

(54) MULTIPLE DATABASE DISPLAY CONTROLLER FOR DISPLAYING MESSAGES HAVING DIFFERENT MESSAGE FORMATS

(75) Inventor: Brice Alan Bucher, Charleston, IL (US)

(73) Assignee: R.R. Donnelley & Sons Company, Chicago, IL (US)

( * ) Notice: Under 35 U.S.C. 154(b), the term of this patent shall be extended for 0 days.

(21) Appl. No.: 09/009,089

(22) Filed: Jan. 20, 1998

(51) Int. Cl.[7] .................................................. G06F 13/00
(52) U.S. Cl. ............................................................. 709/207
(58) Field of Search ..................................... 709/200, 204, 709/205, 207, 213; 707/530; 370/466, 329, 344

(56) References Cited

U.S. PATENT DOCUMENTS 6,034,970 * 3/2000 Levac et al. ......................... 370/466

* cited by examiner

Primary Examiner—Robert B Harrell
(74) Attorney, Agent, or Firm—Marshall, O'Toole, Gerstein, Murray & Borun

(57) ABSTRACT

A binding line system includes a marquee, a line controller arranged to control a binding line, and an auxiliary controller interfaced with the line controller. The line controller is arranged to provide line controller events according to a first protocol, and the auxiliary controller is arranged to provide auxiliary controller events according to a second protocol, wherein the first and second protocols are different. The binding line system includes a first database specific to the first protocol, and a second database specific to the second protocol. A marquee controller accesses the first database in response to a line controller event in order to retrieve a line controller display message having a database format in order to direct the line controller display message to the display device. The marquee controller accesses the second database in response to an auxiliary controller event in order to retrieve an auxiliary controller display message having the database format in order to direct the auxiliary controller display message to the display device.

32 Claims, 3 Drawing Sheets

MULTIPLE DATABASE DISPLAY CONTROLLER FOR DISPLAYING MESSAGES HAVING DIFFERENT MESSAGE FORMATS

TECHNICAL FIELD OF THE INVENTION

The present invention relates to a display controller which controls the display of messages originating from message sources producing messages according to different message protocols and having different message formats.

BACKGROUND OF THE INVENTION

Many data communication systems, such as process control systems, require the display on a single display device of data from multiple processors. An example of a process control system having multiple processors is a binding line for binding books, magazines, and the like. A binding line typically includes a line controller for controlling a plurality of packer boxes for feeding signatures to a gathering conveyor, a binder for binding the signatures together, a trimmer for trimming excess paper off the bound signatures, and the like. An auxiliary controller, which communicates with the line controller, transmits and receives certain information to and from the line controller of the binding line. The auxiliary controller may be arranged to control all equipment on the binding line not controlled by the line controller.

It is often advantageous to display messages to the operators of binding lines in order to help these operators perform their duties efficiently. When the line controller provides messages according to a first message protocol and the auxiliary controller provides messages according to a second, different message protocol, a first display controller capable of managing messages according to the first message protocol may be provided in order to display the messages from the line controller on a display device, and a second display controller capable of managing messages according to the second message protocol may be provided in order to display the messages from the auxiliary controller on the same display device.

However, the use of multiple display controllers adds unnecessary complexity and cost to a process control system such as a binding line or a binding line system. The present invention is directed to a single display controller that is capable of responding to different message protocols from multiple message sources in order to provide display on a single display device of messages having a common format.

SUMMARY OF THE INVENTION

In accordance with one aspect of the present invention, a display controller system, which controls the display of messages provided by first and second controllers of a process control system, comprises a display device, a first database specific to a first message protocol, a second database specific to a second message protocol, and a processor coupled to the display device and the first and second controllers. The first and second message protocols are different. The processor is arranged to retrieve from the first database a first display message corresponding to a first input message in order to direct the first display message to the display device. The first input message is received from the first controller and is in accordance with the first message protocol. The processor is also arranged to retrieve from the second database a second display message corresponding to a second input message in order to direct tie second display message to the display device. The second input message is received from the second controller and is in accordance with the second message protocol.

In accordance with another aspect of the present invention, a method of displaying messages provided by first and second controllers of a process control system, the method comprises the following steps: a) receiving first and second input events in accordance with a first protocol; b) receiving a third input event in accordance with a second protocol, wherein the first and second protocols are different; c) storing the first and second input events in a first database as corresponding first and second display messages; d) addressing a third display message in a second database in accordance with the third input event, the third display message being substantially in accordance with the second protocol; e) if input events in accordance with the first protocol have a higher priority than input events in accordance with the second protocol, displaying one of the first and second display messages before the third display message; and f) if input events in accordance with the second protocol have a higher priority than input events in accordance with the first protocol, displaying the third display message before the first and second display messages.

In accordance with yet another aspect of the present invention, a binding line system comprises a display device, a line controller arranged to control a binding line, an auxiliary controller interfaced with the line controller, a first database receiving line controller event messages having a first event message format, a second database receiving auxiliary controller event messages having a second event message format, and a display controller coupled to the display device, the line controller, and the auxiliary controller. The first and second event message formats are different. The auxiliary controller is arranged to provide an auxiliary controller event message, and the line controller is arranged to provide a line controller event message. The display controller is arranged to retrieve from the first database a line controller display message corresponding to the line controller event message in order to direct the line controller display message to the display device, and the display controller is arranged to retrieve from the second database an auxiliary controller display message corresponding to the auxiliary controller event message in order to direct the auxiliary controller display message to the display device. The line controller display message and the auxiliary controller display message have a common database format.

In accordance with a further aspect of the present invention, a display controller system comprises displaying means for displaying display messages, a first database specific to a first protocol, a second database specific to a second protocol which is different from the first protocol, and display controlling means responsive to a first event transmitted in accordance with the first protocol and to a second event transmitted in accordance with the second protocol for converting the first and second events to corresponding display messages having a common database format and for controlling the displaying means in order to display the display messages.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
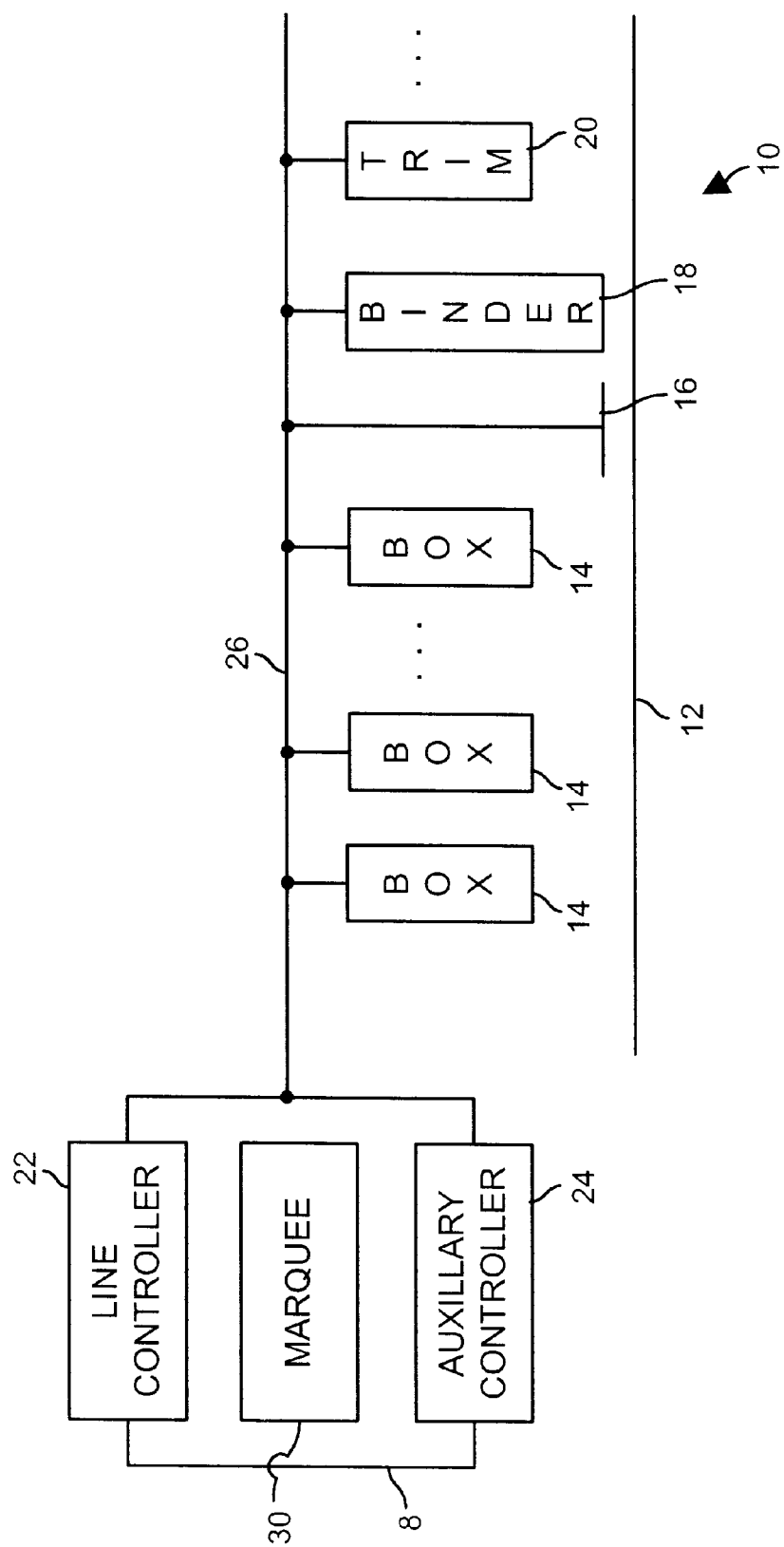
FIG. 1 illustrates a binding line system which includes a line controller and in which the present invention may be implemented.

As shown in FIG. 1, a binding line 10 includes a conveyer 12 which extends along a plurality of packer boxes 14, a caliper 16, a binder 18, a trimmer 20, and other elements of a binding line not shown. The packer boxes 14, as is known in the art, are arranged to supply signatures to the conveyer 12. The conveyer 12 gathers the signatures in a known manner in order to form books. The caliper 16 senses the thickness of each of the books in order to determine whether the correct number of signatures have been fed by the packer boxes 14 to each book as it is conveyed along the conveyor 12. Normally, there is a reject gate (not shown) used in conjunction with the caliper 16 in order to reject any books which have an incorrect thickness and, therefore, have an incorrect number of signatures.

The binder 18 binds the signatures together in order to secure the signatures into the corresponding books. Binders known in the art include stitchers usually used in the case where the signatures form magazines, patent binders usually used for paperbacks and hard cover books, and the like. The trimmer 20 trims off any excess paper from the signatures which have been provided by the packer boxes 14 and which have been bound together by the binder 18. The binding line 10 may also include other elements not shown.

Finally, a line controller 22 and an auxiliary controller 24 are provided to control the binding line 10. As is known, the line controller 22 and the auxiliary controller 24 transmit messages over a communication link 26 in order to control the various elements of the binding line 10, such as the packer boxes 14, the binder 18, the trimmer 20, and the like. The line controller 22 and the auxiliary controller 24 also receive messages over the communication link 26 from various sensors of the binding line 10, such as the caliper 16. As discussed above, the auxiliary controller 24 communicates with the line controller 22 over a communication link 28 in order to transmit and receive certain information to and from the line controller 22, and may be arranged to control all equipment of the binding line 10 that is not controlled by the line controller 22.

In accordance with the present invention, the line controller 22 includes a display controller, which is disclosed hereinbelow, in order to control the display of messages on a marquee 30. The marquee 30 typically is a large display so that an operator may be able to discern the messages displayed thereon wherever the operator happens to be along the binding line 10. When the binding line 10 is long, such as when the binding line 10 is arranged to form hard cover books, several marquees, such as the marquee 30, may be provided at predetermined points along the length of the binding line 10.

As suggested above, the message protocol employed by the auxiliary controller 24 in transmitting event messages over the communication link 28 may be different from the message protocol of the event messages communicated over the communication link 26 between the line controller 22 and the binding line 10. Therefore, because the same marquee 30 is used to display event messages from both the line controller 22 and the auxiliary controller 24, and because the event messages processed by the line controller 22 may be transmitted according to a different message protocol from the message protocol of the messages processed by the auxiliary controller 24, an arrangement must be provided to convert, as necessary, the event messages processed by the line controller 22 and the auxiliary controller 24 to a common display format for the marquee 30.

Figure 2:
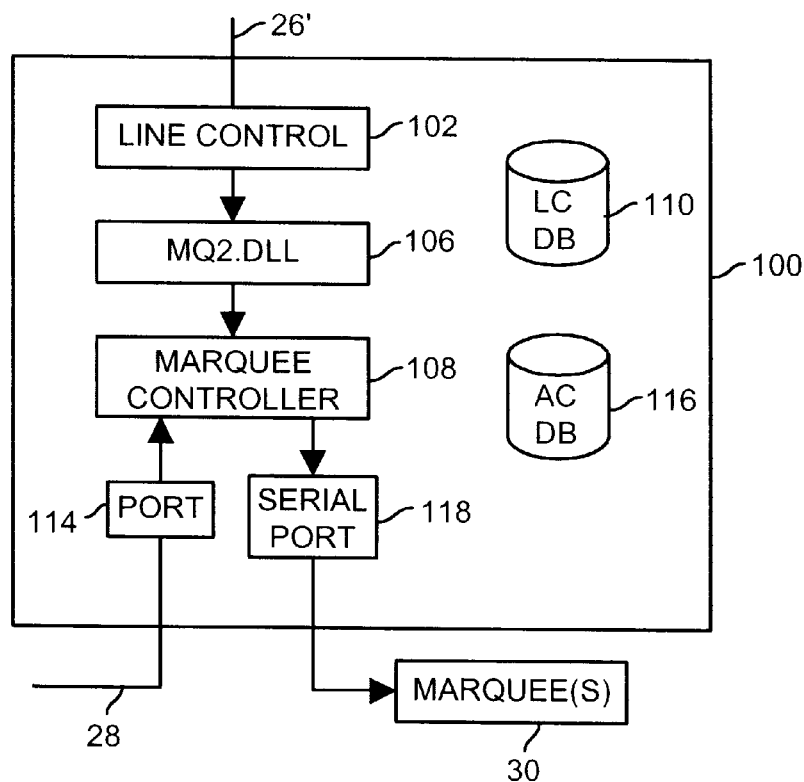
FIG. 2 illustrates in greater detail the line controller which is shown in FIG. 1, which includes a line controller event filter and a marquee controller, and which incorporates the present invention.

One such arrangement, which is incorporated into a line controller 100, is illustrated in FIG. 2. As illustrated in FIG. 2, control of a marquee (display) is provided by a marquee (display) controller which may be part of the line controller 100. The line controller 100, for example, may be used for the line controller 22 shown in FIG. 1. The line controller 100 may be in the form of a PC running a Windows NT™ or a Windows 95™ operating system.

The line controller 100 includes a line control module 102 which performs all of the line controlling functions traditionally performed by existing line controllers. The line control module 102 may be provided by software which is executed by the line controller 100 as is known in the art. The line control module 102 communicates over the communication link 26 with the binding line 10, which is controlled by the line control module 102. The line controller event messages transmitted over the communication link 26 between the binding line 10 and the line control module 102 are provided to a filter 106 which may be in the form of a dynamic link library (DLL) file. The filter 106 essentially operates in accordance with the flow chart shown in FIG. 3, which will be described hereinbelow. The primary function of the filter 106 is to determine which of the event messages transmitted between the line control module 102 and the binding line 10 over the communication link 104 should be displayed and which should not. Accordingly, the filter 106 filters out those event messages which are not to be displayed and passes those event messages which are to be displayed to a marquee controller 108.

The marquee controller 108 queues the line controller event messages, which are transmitted between the line control module 102 and the binding line 10 and which pass through the filter 106, in a line controller display message database 110. When line controller event messages are stored in the line controller display message database 110, these messages may be referred to herein as line controller display messages. The marquee controller 108 queues the line controller event messages passing through the filter 106 in order of their priority. This priority is typically provided by the line control module 102 itself and may be determined from the line controller events.

As shown in FIGS. 1 and 2, the auxiliary controller 24 is connected to the line controller 100 over the communication link 28. The communication link 28 is connected to a port 114 of the line controller 100. The port 114 receives auxiliary controller event messages from the auxiliary controller 24 over the communication link 28 and provides those auxiliary controller event messages to the marquee controller 108. The line controller display messages stored in the line controller display message database 110 require display formatting in order to be intelligibly displayed on the marquee 30. This same display formatting cannot also be used on the auxiliary controller event messages as they are received by the marquee controller 108 because the protocols used to transmit the line controller event messages and the auxiliary controller event messages are different, and because the display formatting is based only on the protocol of the line controller event messages.

Thus, the auxiliary controller event messages require conversion before they may be display formatted.

Accordingly, the marquee controller 108 is arranged to use the auxiliary controller event messages as addresses into an auxiliary controller display message database 116. The auxiliary controller display message database 116 stores in a lookup table an auxiliary controller display message for each different type of auxiliary controller event message that may be transmitted by the auxiliary controller 24. The auxiliary controller display messages stored in the auxiliary controller display message database 116 have a database message protocol (i.e., a database format) substantially identical to the database message protocol of the line control display messages stored in the line controller display message database 110. When the marquee controller 108 receives an auxiliary controller event message from the port 114, therefore, the marquee controller 108 uses this auxiliary controller event message as an address into the auxiliary controller display message database 116 in order to retrieve an auxiliary controller display message stored at that address. This retrieved auxiliary controller display message can now undergo the same display formatting as the line controller display messages.

The marquee controller 108 supplies the line controller display messages queued in the line controller display message database 110 through the serial port 118 to the marquee 30 before the auxiliary controller display messages retrieved from the auxiliary controller display message database 116 if the line controller display messages are assigned a higher priority than the auxiliary controller display messages. For example, this assignment may be made by the binding line operator. If a lower priority auxiliary controller event message is received by the line controller 100 before all higher priority line controller display messages queued in the line controller display message database 110 are displayed, it may be necessary to temporarily store the auxiliary controller event message until all of the line controller display messages queued in the line controller display message database 110 are displayed by the marquee 30. The amount of time that one display message is displayed on the marquee 30 before another display message is displayed may be set by the binding operator using a user interface to the line controller 100. If line controller display messages are assigned a higher priority than the auxiliary controller display messages, and if plural line controller display messages are queued in the line controller display message database 110, the marquee controller 108 retrieves these line controller display messages on the basis of their relative priorities.

Alternatively, the marquee controller 108 may be arranged to supply the auxiliary controller display messages retrieved from the auxiliary controller display message database 116 through the serial port 118 to the marquee 30 before the line controller display messages queued in the line controller display message database 110 if the corresponding auxiliary controller event messages are assigned a higher priority than the line controller event messages. Once an auxiliary controller display message has been displayed by the marquee 30 for the selected amount of time, the marquee controller 108 retrieves for display the line controller display messages stored in the line controller display message database 110, if any, on the basis of their relative priorities.

Figure 3:
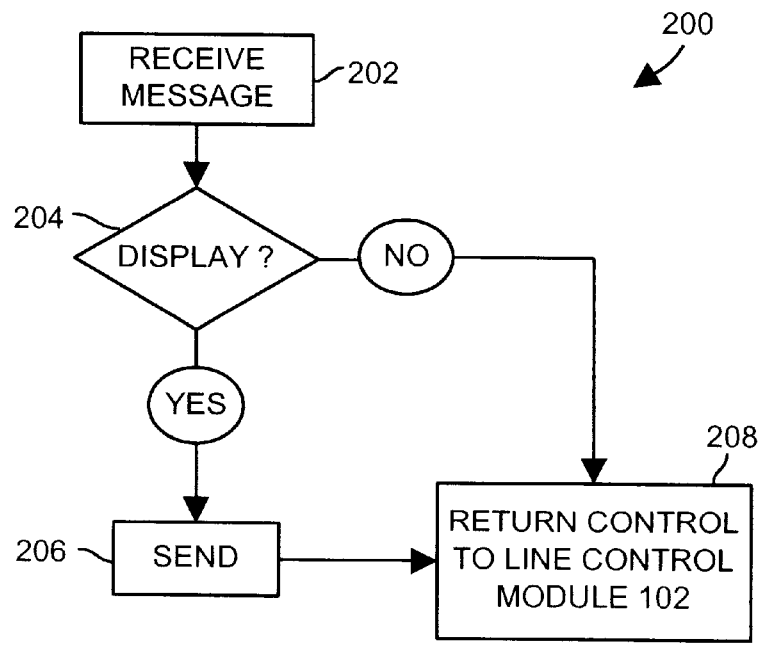
FIG. 3 illustrates the line controller event filter of FIG. 2 in additional detail; and, FIG. 4 illustrates the marquee controller of FIG. 2 in additional detail.

The filter 106 operates in accordance with a flow chart 200 which is shown in FIG. 3. When a line controller event message is received from the line control module 102 as indicated by a block 202, a block 204 determines whether the line controller event message contains a displayable event. For example, the block 204 may be based upon hard coded decisions which are preselected to filter out line controller event messages not containing displayable events. If the line controller event message contains a displayable event, a block 206 sends the line controller event message to the marquee controller 108 which stores the line controller event message as a line controller display message in the line controller display message database 110. If the line controller event message received by the filter 106 does not contain a displayable event as determined at the block 204, or after the block 206 sends the line controller event message to the marquee controller 108, control is returned to the line control module 102 at a block 208.

Figure 4:
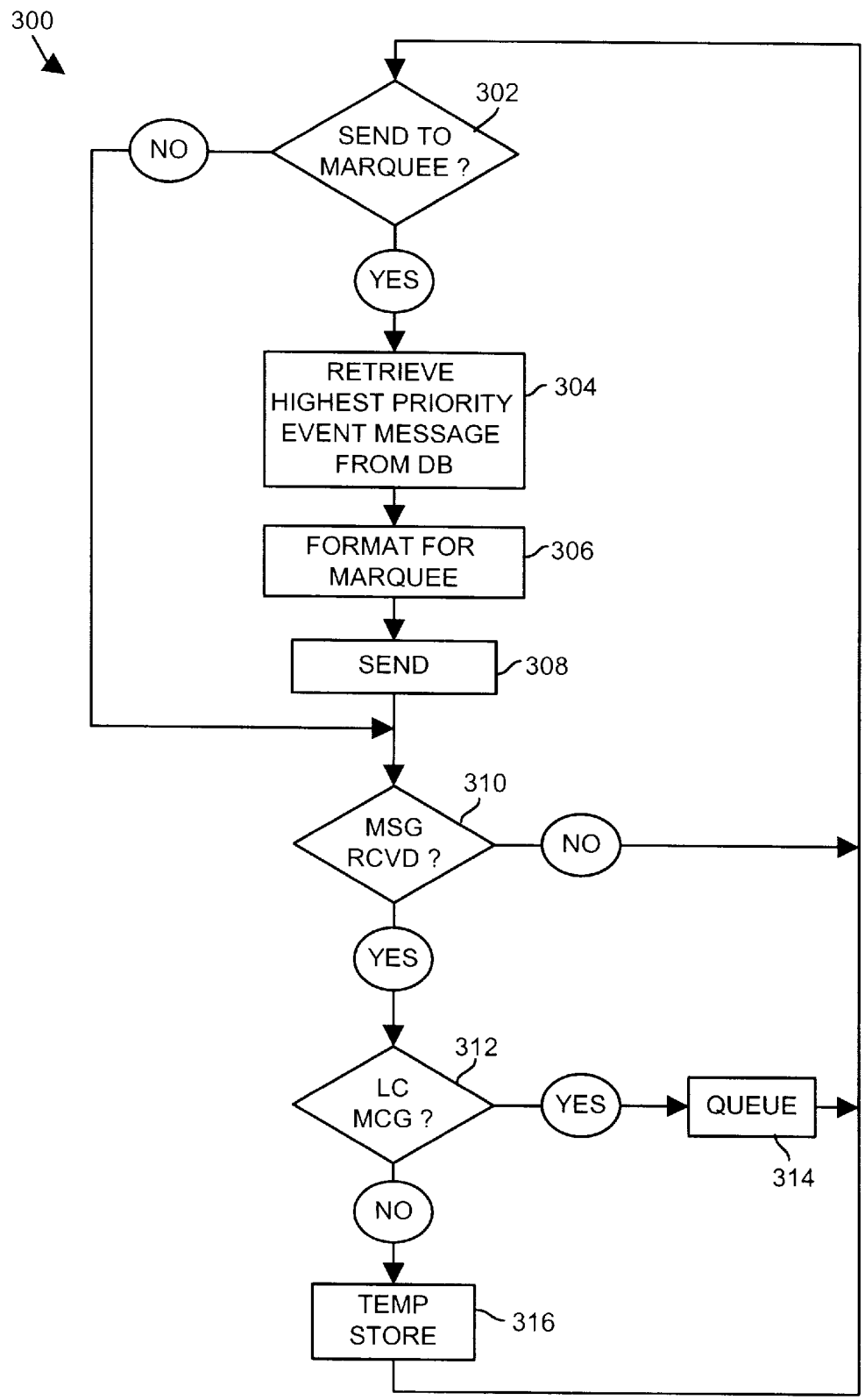

The marquee controller 108 functions in accordance with a flow chart 300 illustrated in FIG. 4. A block 302 of the flow chart 300 determines (i) whether the marquee 30 is ready to accept the next display message, and (ii) whether there is a next display message to be displayed (i.e., whether a line controller display message is contained in the line controller display message database 110 or whether an auxiliary controller event message has been received through the port 114 and has not yet been displayed). If the marquee 30 is ready to accept another display message, and if a line controller display message is contained in the line controller display message database 110 or if an auxiliary controller event message has been received through the port 114 and has not yet been displayed, a block 304 retrieves the display message from the appropriate database according to the highest priority event. For example, if the highest priority display message waiting to be displayed on the marquee 30 is a line controller display message queued in the line controller display message database 110, that display message is retrieved from the line controller display message database 110 at the block 304. On the other hand, if the highest priority display message waiting to be displayed corresponds to an auxiliary controller event message temporarily stored upon receipt at the port 114, that event message is used as an address into the auxiliary controller display message database 116 in order to retrieve the corresponding auxiliary controller display message at the block 304. In determining which display message to retrieve, the block 304 may apply any of the priority strategies discussed above.

A block 306 formats the highest priority display message retrieved at the block 304 for display on the marquee 30, and a block 308 sends the formatted highest priority display message through the serial port 118 to the marquee 30. As discussed above, the block 306 applies essentially the same formatting to the display messages retrieved from the line controller display message database 110 and from the auxiliary controller display message database 116. However, the formatting applied at the block 306 is configured according to the message protocol used for the line controller event messages. As a result, the line controller event messages may be stored as line controller display messages in the line controller display message database 110 without conversion. However, the auxiliary controller event messages are transmitted according to a protocol which is different from the protocol used for the line controller event messages. Therefore, the auxiliary controller event messages must be converted to a message protocol substantially similar to the message protocol of the line controller event messages before they are processed at the block 306. The auxiliary controller display message database 116 is used for this conversion. Thus, line controller display messages and auxiliary controller display messages processed at the block 306 are suitable for display on the marquee 30.

After the block 308 sends a message through the serial port 118 to the marquee 30, or if it is not time to send a display message to the marquee 30 as determined at the block 302, program flow proceeds to a block 310 which determines whether the marquee controller 108 has received an event message from either the filter 106 or through the port 114. If the block 310 determines that the marquee controller 108 has not received an event message from either the filter 106 or through the port 114, program flow returns to the block 302.

If the block 310 determines that the marquee controller 108 has received an event message from either the filter 106 or through the port 114, a block 312 determines whether the event message is from the filter 106 (i.e., whether the event message is a line controller event). If so, a block 314 queues the line controller event message as a line controller display message in the line controller display message database 110, and program flow returns to the block 302. If the event message is not from the filter 106, then the event message must be an auxiliary controller event from the port 114, in which case a block 316 temporarily stores the auxiliary controller event message from the auxiliary controller 24 to await processing at the blocks 302–308, and program flow returns to the block 302.

The following is an example of the messages described above. One of the events monitored by a line controller is a missing signature in a packer box, and one of the events monitored by a auxiliary controller is a tripped temperature switch on a vacuum pump. When these events occur, the line controller 22/102 sends the text string PKT CHK 1 IN N MISSED SIGNATURE along with other parameters, such as a time stamp, a priority, etc., to the marquee controller 108 through the filter 106, where N is the number of the packer box having the missing signature. In response to this text string, the marquee controller 108 creates a new record in the line controller display message database 110, and saves this text string and the other parameters to this new record.

Also, the auxiliary controller 24 assigns a predetermined integer code to the tripped temperature switch event. This predetermined integer code may be, for example, 169. The auxiliary controller 24 then sends this integer code to the marquee controller 108 through the port 114. The marquee controller uses this integer code as an address into the auxiliary controller display message database 116.

The auxiliary controller display message database 166 stores the auxiliary controller display message VACUUM PUMP OVER-TEMPERATURE at the address 169, and this display message is retrieved by the marquee controller 108 based on the integer code 169 which it receives from the auxiliary controller 24.

Based upon the brand and model of the marquee 30, the line controller display message PKT CHK 1 IN N MISSED SIGNATURE is formatted for correct display on the marquee 30. If the marquee 30 is supplied by Total Control Products, for example, the marquee controller 108 at the block 306 concatenates ASCII control codes onto either the front, back, or both the front and back of the line controller display message PKT CHK 1 IN N MISSED SIGNATURE. For instance, the line controller display message PKT CHK 1 IN N MISSED SIGNATURE may be formatted as follows: PKT CHK 1 IN N MISSED SIGNATURE CTRL-I CTRL-A CTRL-B CTRL-M. When this display message is received by the marquee 30, the display message PKT CHK 1 IN N MISSED SIGNATURE scrolls from right to left on line 2 of the marquee 30. The operator determines the formatting method implemented by the marquee controller 108.

Also, the auxiliary controller display message VACUUM PUMP OVER-TEMPERATURE is retrieved from the auxiliary controller display message database 116 based upon the integer code 169 and is formatted in a similar way. That is, if the marquee 30 is supplied by Total Control Products, the marquee controller 108 at the block 306 concatenates ASCII control codes onto either the front, back, or both the front and back of the auxiliary controller display message VACUUM PUMP OVER-TEMPERATURE. For instance, the auxiliary controller display message VACUUM PUMP OVER-TEMPERATURE may be formatted as follows: VACUUM PUMP OVER-TEMPERATURE CTRL-B CTRL-A CTRL-C CTRL-M. When this display message is received by the marquee 30, the display message VACUUM PUMP OVER-TEMPERATURE flashes in large letters on the marquee 30. Again, the operator determines the formatting method implemented by the marquee controller 108.

The above example is illustrative only such that the various messages and formatting may have any other desired constructions.

Certain modifications of the present invention have been discussed above. Other modifications will occur to those practicing in the art of the present invention. For example, as described above, the marquee controller 108 queues the line controller event messages passing through the filter 106 in order of the priority determined from the line controller events. Alternatively, the marquee controller 108 may be configured to rearrange the order of the line controller event messages queued in the line controller message display database 110. For instance, a sorting sequence may be stored in memory and may be accessed by the marquee controller 108 each time it receives a line controller event message which passes through the filter 106. The marquee controller 108 then accesses the memory based upon the line controller event message in order to retrieve the sorting sequence, and queues this line controller event message in the line controller display message database 110 according to the sorting sequence.

Also, as disclosed above, the block 204 executes logical code in order to determine whether the received line controller event message contains a displayable event. Alternatively, the block 204 may determine whether the received line controller event message contains a displayable event by accessing a library which contains displayable line controller events.

Moreover, as described above, the filter 106 is used to filter out some of the line controller event messages so that they are not stored in the line controller display message database 110. Instead, all line controller event messages may be stored in the line controller display message database 110 so that the filter 106 is used merely to pass line controller event messages to the marquee controller 108. Similarly, a filter may be used to filter out some of the auxiliary controller event messages so that they are not all used to access the auxiliary controller display message database 116.

In addition, the description above indicates that the line controller display messages may be displayed before the auxiliary controller display messages or that the auxiliary controller display messages may be displayed before the line controller display messages depending on whether line controller display messages or auxiliary controller display messages have higher priority, and that line controller display messages may be displayed relative to one another depending on their relative priorities. However, it may be possible to mix priorities between the auxiliary controller display messages and the line controller display messages so that some line controller display messages have priorities higher than the priorities of some auxiliary controller display messages, while other line controller display messages have priorities lower that the priorities of others of the auxiliary controller display messages. Similarly, some auxiliary controller display messages may have priorities higher than the priorities of some line controller display messages, while other auxiliary controller display messages may have priorities lower than the priorities of others of the line controller display messages.

Furthermore, as describe above, the display formatting performed at the block 306 is based on the protocol of the line controller event messages so that line controller event messages can be stored as is in the line controller display message database 110, and so that auxiliary controller event messages require conversion by the auxiliary controller display message database 116. Alternatively, the display formatting performed at the block 306 may be based on the protocol of the auxiliary controller event messages so that auxiliary controller event messages can be stored as is in the auxiliary controller display message database 116, and so that line controller event messages require conversion by the line controller display message database 110. Other alternatives are also possible.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A display controller system for controlling the display of messages provided by first and second controllers of a process control system, the display controller system comprising:
    a display device;
    a first database specific to a first message protocol;
    a second database specific to a second message protocol, wherein the first and second message protocols are different; and,
    a processor coupled to the display device and the first and second controllers, wherein the processor is arranged to retrieve from the first database a first display message corresponding to a first input message in order to direct the first display message to the display device, wherein the first input message is received from the first controller and is in accordance with the first message protocol, wherein the processor is arranged to retrieve from the second database a second display message corresponding to a second input message in order to direct the second display message to the display device, wherein the second input message is received from the second controller and is in accordance with the second message protocol.

2. The display controller system of claim 1 wherein the processor includes a display formatter, and wherein the display formatter is arranged to format the first and second display messages into a common display format.

3. The display controller system of claim 2 wherein the second database is arranged to convert the second input message to the second display message.

4. The display controller system of claim 3 wherein the first database is a message queue which stores the first input message as the first display message.

5. The display controller system of claim 4 wherein the first input message has a priority, and wherein the message queue stores the first input message in accordance with the priority.

6. The display controller system of claim 4 wherein the second database is a look-up table that is addressed in accordance with the second input message in order to read out the second display message.

7. The display controller system of claim 3 wherein the second database is a look-up table that is addressed in accordance with the second input message in order to read out the second display message.

8. The display controller system of claim 2 wherein the first database is a message queue which stores the first input message as the first display message.

9. The display controller system of claim 8 wherein the first input message has a priority, and wherein the message queue stores the first input message in accordance with the priority.

10. The display controller system of claim 1 wherein the second display message is substantially in accordance with the first message protocol.

11. The display controller system of claim 10 wherein the first database is a message queue which stores the first input message as the first display message.

12. The display controller system of claim 11 wherein the first input message has a priority, and wherein the message queue stores the first input message in accordance with the priority.

13. The display controller system of claim 11 wherein the second database is a look-up table that is addressed in accordance with the second input message in order to read out the second display message.

14. The display controller system of claim 10 wherein the second database is arranged to convert the second input message to the second display message.

15. The display controller system of claim 14 wherein the second database is a look-up table that is addressed in accordance with the second input message in order to read out the second display message.

16. The display controller system of claim 1 wherein the second database is arranged to convert the second input message in accordance with the second message protocol into the second display message substantially in accordance with the first message protocol.

17. The display controller system of claim 16 wherein the first database is a message queue which stores the first input message as the first display message having the second format.

18. The display controller system of claim 17 wherein the second database is a look-up table that is addressed in accordance with the second input message in order to read out the second display message.

19. The display controller system of claim 16 wherein the second database is a look-up table that is addressed in accordance with the second input message in order to read out the second display message.

20. The display controller system of claim 1 wherein the first database is a message queue which stores the first input message as the first display message.

21. The display controller system of claim 20 wherein the message queue stores the first input message in accordance with a priority scheme.

22. A method of displaying messages provided by first and second controllers of a process control system, the method comprising the following steps:
    a) receiving first and second input events in accordance with a first protocol;
    b) receiving a third input event in accordance with a second protocol, wherein the first and second protocols are different;

c) storing the first and second input events in a first database as corresponding first and second display messages;

d) addressing a third display message in a second database in accordance with the third input event, the third display message being substantially in accordance with the second protocol;

e) if input events in accordance with the first protocol have a higher priority than input events in accordance with the second protocol, displaying one of the first and second display messages before the third display message; and, f) if input events in accordance with the second protocol have a higher priority than input events in accordance with the first protocol, displaying the third display message before the first and second display messages.

23. The method of claim 22 wherein step d) comprises the step of addressing a look-up table in accordance with the third input event.

24. The method of claim 23 wherein step c) comprises the step of queuing the first and second input events as corresponding first and second display messages according to a relative difference in priority.

25. The method of claim 24 wherein step c) comprises the step of displaying the one of the first and second display messages depending upon which of the first and second input events has a higher priority.

26. The method of claim 22 wherein step c) comprises the step of queuing the first and second input events as corresponding first and second display messages according to a relative difference in priority.

27. The method of claim 26 wherein step c) comprises the step of displaying the one of the first and second display messages depending upon which of the first and second input events has a higher priority.

28. A binding line system comprising:

a display device;

a line controller arranged to control a binding line, wherein the line controller is arranged to provide a line controller event message;

an auxiliary controller interfaced with the line controller, wherein the auxiliary controller is arranged to provide an auxiliary controller event message;

a first database receiving line controller event messages having a first event message format;

a second database receiving auxiliary controller event messages having a second event message format, wherein the first and second formats are different; and, a display controller coupled to the display device, the line controller, and the auxiliary controller, wherein the display controller is arranged to retrieve from the first database a line controller display message corresponding to the line controller event message in order to direct the line controller display message to the display device, wherein the display controller is arranged to retrieve from the second database an auxiliary controller display message corresponding to the auxiliary controller event message in order to direct the auxiliary controller display message to the display device, and wherein the line controller display message and the auxiliary controller display message have a common database format.

29. The binding line system of claim 28 wherein the second database is a look-up table that is addressed in accordance with the auxiliary controller event message in order to read out the auxiliary controller display message.

30. The binding line system of claim 29 wherein the first database is a message queue which stores the line controller event message as the line controller display message.

31. The binding line system of claim 28 wherein the first database is a message queue which stores the line controller event message as the line controller display message.

32. A display controller system comprising:

displaying means for displaying display messages;

a first database specific to a first protocol;

a second database specific to a second protocol, wherein the first and second protocols are different; and, display controlling means responsive to a first event transmitted in accordance with the first protocol and to a second event transmitted in accordance with the second protocol for converting the first and second events to corresponding display messages having a common database format and for controlling the displaying means in order to display the display messages.

* * * * *